Figures 1, 4, 5, 6, 7:
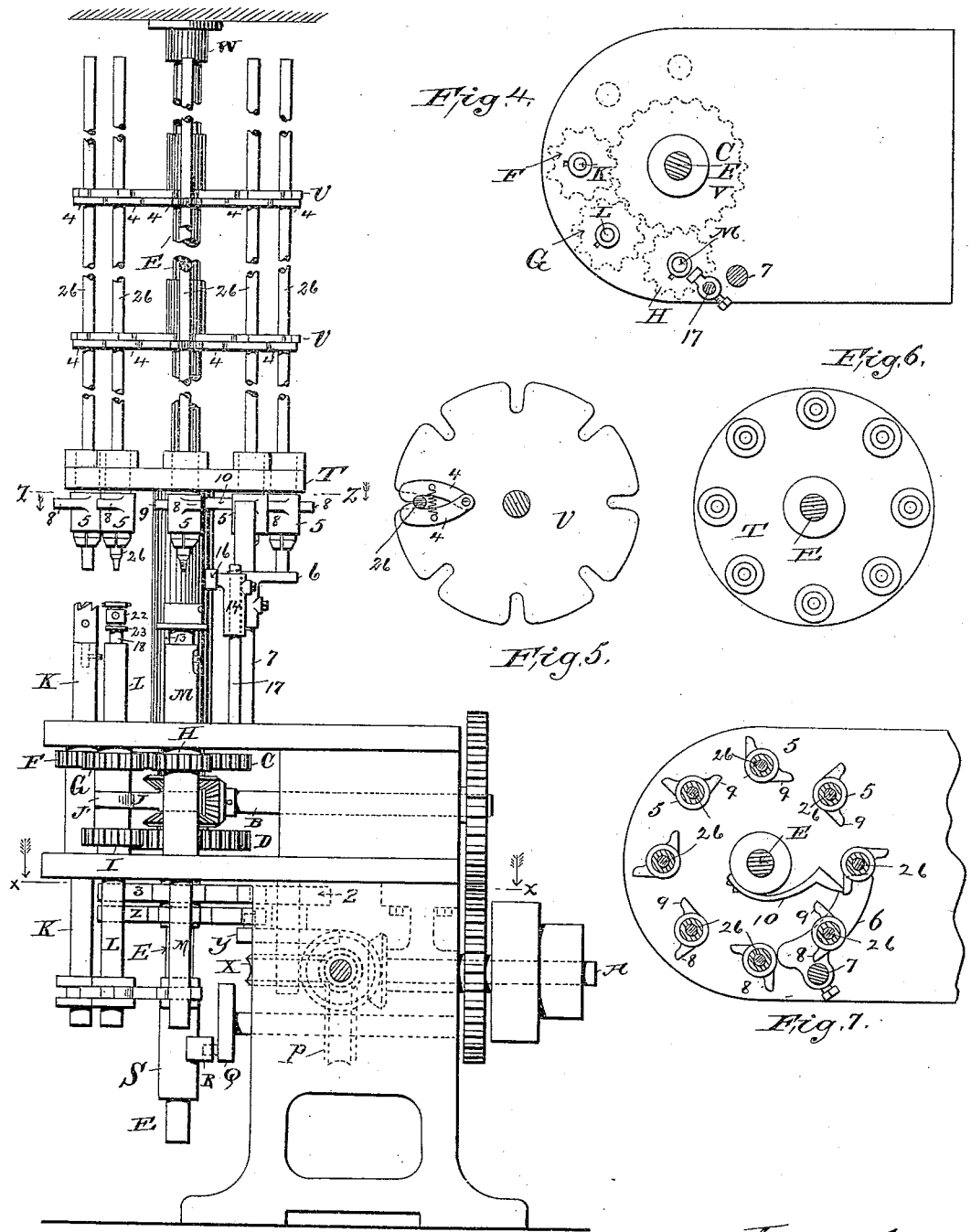

(No Model.) 2 Sheets—Sheet 1.

J. STEINER.
SCREW MAKING MACHINE.

No. 511,817. Patented Jan. 2, 1894.

Attest:
C. W. Benjamin
Wm. H. Capel.

Inventor:
Josef Steiner
by H. L. Townsend
Atty.

(No Model.) 2 Sheets—Sheet 2.
J. STEINER.
SCREW MAKING MACHINE.
No. 511,817. Patented Jan. 2, 1894.
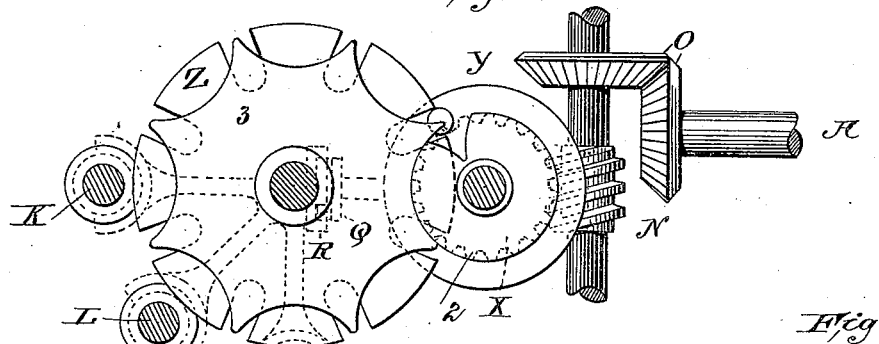
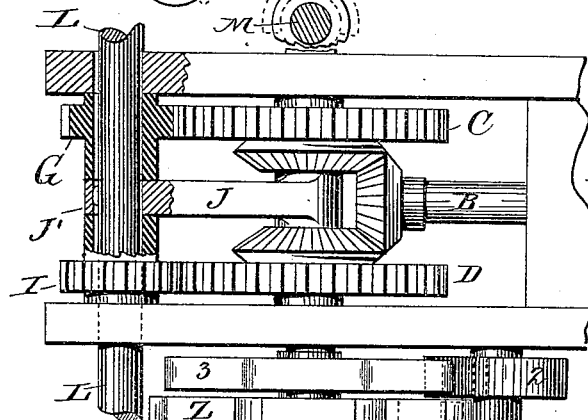
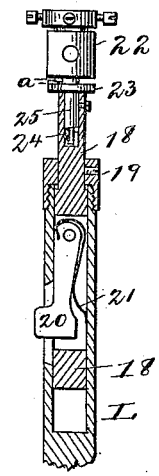
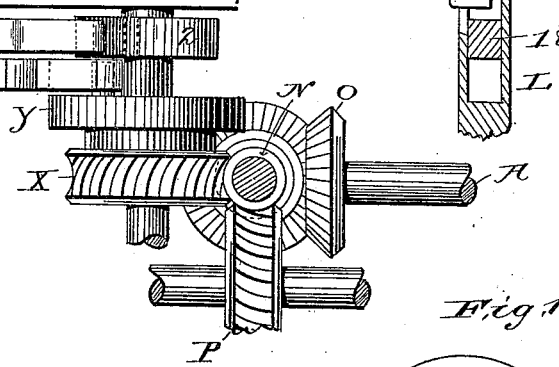
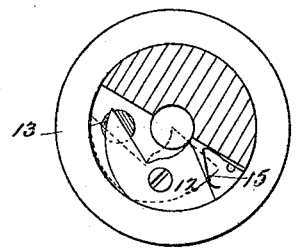
Attest
C. W. Benjamin
Wm. N. Capel
Inventor,
Josef Steiner
by H. C. Townsend
Atty

UNITED STATES PATENT OFFICE.

JOSEF STEINER, OF BROOKLYN, NEW YORK.

SCREW-MAKING MACHINE.

SPECIFICATION forming part of Letters Patent No. 511,817, dated January 2, 1894.

Application filed June 24, 1893. Serial No. 478,704. (No model.)

*To all whom it may concern:*

Be it known that I, JOSEF STEINER, a citizen of the United States, and a resident of Brooklyn, in the county of Kings and State of New York, have invented a certain new and useful Screw-Making Machine, of which the following is a specification.

This invention relates to that class of machines used in making screws, nuts and the like in which rods or blank stock are fed to cutters or formers and the finished product turned out. Such machines as usually constructed require the rod or blank to be fed forward, clamped and rotated while several different reduction tools are brought successively into operation thereupon; all the tools except the one in use remaining idle meanwhile. These tools may be brought into operation by hand or automatically, but in their action upon the blank, the shaper is followed by the die, and the die by the cutter and so on in succession.

The main object of my invention is to carry on these several operations simultaneously. This is done by inserting in the machine several rods at once and operating upon them at the same time by the shaper, the die and the cutter, respectively. In doing this the rods may be advanced, clamped and held stationary, while the tools are rotated and reciprocated.

In carrying out my invention I prefer to use a machine, constructed substantially as illustrated, wherein any number of rods or blanks are inserted, preferably a number greater than that of the simultaneously operating tools. The rods are then advanced within reach of the tools and clamped rigidly in place while the tools are simultaneously rotated and advanced in their operation upon the rods and simultaneously withdrawn when their operation is completed.

Another object of my invention is to advance the rods by gravity and to do this I place them on end in the machine in what may be termed a gravity feeding blank carrier. This simplifies the construction of the machine by the omission of the usual rod feeding mechanism. All that is required to feed the rods is the release of the chucks and as this release and the subsequent clamping are accomplished automatically, the feeding operation becomes a very simple matter. Another advantage gained in this manner of feeding lies in the decrease of the floor space required for the machine. Not only will my machine do at least three times the amount of work done by the ordinary machines, but at least three of them can be set up in the space occupied by one of the ordinary machines.

My invention consists in the construction and combination of parts which will be hereinafter described and pointed out in the claims.

In describing the construction and operation of my screw cutting machine reference is had to the accompanying drawings, forming a part of this specification, upon which like reference characters refer to like parts and in which—

Figure 1, is a front elevation showing the tool rods retracted. Fig. 2, is a horizontal section on line $x$, $x$, of Fig. 1. Fig. 3, is a sectional elevation of Fig. 2, showing the tool driving gear, the die operating gear and the intermittent and locking gear for the rod carrier. Fig. 4, is a plan showing the machine top and the position of the tools and their operating gears. Fig. 5, is an under side view of one of the upper rod carrying disks showing one of the pairs of automatic rod-holding catches. Fig. 6, is a plan of the chuck-carrying disk. Fig. 7, is a horizontal section on the line $z$, $z$, Fig. 1, illustrating the chuck operating means. Fig. 8, is a vertical axial section on an enlarged scale, through the die or tap rod. Fig. 9, represents a vertical central section through the cutter, and also shows the cutter stop and a screw to be cut from the rod. Fig. 10, is an enlarged horizontal section through the cutter on the line $v$, $v$.

A suitable frame is constructed for the support of the various shafts, gearing and other parts. The motor shaft is represented at A, and from this motion is conveyed through suitable gears to the shaft B, on the inner end of which is a bevel gear meshing with two other bevel gears. The upper one is secured to the gear wheel C, and the lower one to a similar gear wheel D. These two gear wheels and their attached bevel gears are loosely mounted upon the rod carrier shaft E. The upper one C, meshes with all the tool pinions F, G, H, while D, meshes only with the reversing pinion I, of the die. The gear wheels C, and the pinion G, are separated from the gear wheel D, and the pinion I, by means of collars which are united and held in place by the bar J.

Of the various reduction tools that may be used in my machine I will describe the operation of only three—the shaper which makes the first cut, the die which follows the shaper and the cutter which severs the screw from the rod. These tools are carried on the rods K, L, M, respectively. These rods pass freely through the upper and lower plates of the frame and also are free to reciprocate through their driving pinions. They are, however, provided with splines which travel in grooves in said pinions and therefore rotate with the pinions. The shaper and cutter rods have each but one pinion and rotate always in the same direction. The die rod has two pinions, the one G, for rotating it while the die is cutting and the other I, for reversing it to remove it from the screw. The spline on the die rod is shorter than the thickness of the collar J′, interposed between the pinions G and I, which affords a housing for it while it seeks its groove in the reversing pinion I.

The tool rods receive their reciprocating motion from the motor shaft through the worm N, which is driven by a pair of bevel gears O, and which in turn transmits its motion through the worm wheel P, and disk Q, with its wrist pin playing in the straight cam R, upon the sleeve S, to a set of arms carried by said sleeve and engaging by forked ends with collars upon the lower ends of said tool rods K, L, M. Sleeve S, as seen, is mounted upon the rod carrier shaft E. This rod carrier which consists of the central shaft E, and the disks T and U, is supported in a vertical position upon the pedestal V, and steadied at its upper end by the bearing W, which may be secured to the ceiling or supported from the machine in any suitable way. Between the disk T, and the pedestal may be interposed a ball bearing to allow of ready rotation of the rod carrier. Said carrier is rotated intermittently step by step. For this purpose there is mounted in mesh with the worm a worm wheel X, upon the vertical shaft of which is secured a one-pin gear Y. As this gear rotates, the pin thereof engages the peripherally slotted intermittent gear Z, which is keyed to the rod-carrier shaft E, and causes the rod carrier to rotate at fixed intervals through the distance between adjacent tools and as the tools and rods are at the same distance apart it rotates through the distance between the rods. After each partial rotation of the carrier it is rigidly locked, to be again unlocked when it is time for the next partial rotation to take place. This locking and unlocking is done automatically. Upon the shaft carrying the worm wheel X, is mounted a notched locking cam 2, which co-operates with a fluted locking wheel 3, keyed to the rod carrier shaft E. The points between the flutes register with the slot in the intermittent gear and the notch in the cam registers with the pin on the one-pin gear, so that as the pin engages a slot, a point of the fluted wheel enters the notch in the cam and the rod carrier turns till the pin leaves the slot. The cam is then in complete engagement with one of the flutes and it is impossible for the rod carrier to again move till the notch in the cam comes opposite a point of the fluted wheel. The pin then enters another slot of the intermittent wheel and the carrier is given another partial rotation.

The rods may be inserted into the carrier in any convenient way, but I prefer to insert them laterally. To provide for this the disks U, have radial notches in their periphery in which the rods are placed and in which they may be retained by any suitable catch. I have shown one form of catch for this purpose which is operated by the rod as it is pressed into the slot. This catch consists of two hooked pieces 4, 4, pivoted at one end and having their opposite hooked ends faced toward each other at the peripheral slot so as to close the outer end of the slot and retain the rod therein. These retaining hooks have their meeting ends beveled so that they may be easily separated by a rod being pressed into a slot. They are also joined together by a spring so that they will come together again as soon as the rod has passed their ends. After a rod has been inserted in the disks U, it is lowered through one of the chucks 5, corresponding therewith until it rests upon the stop plate 6, which is adjustably mounted upon the stop 7, at a position to allow a sufficient length of rod to protrude from the chucks for producing the required screw. The chuck is then tightened. It will be noticed that in feeding a rod to the tools all that is necessary is to loosen its chuck, the rod then dropping of its own weight upon the stop plate. The loosening and tightening of the chucks are done automatically. Upon each chuck are formed two lugs 8, 9, see Fig. 7, and as the carrier is rotated, after a screw is cut off the lug 8, strikes the top 7, and loosens the clamp. The rod then drops upon the stop plate 6, and slides along on that until the lug 9, strikes the projecting end of a spring mounted stop 10, which is secured to the pedestal V, thereby securely tightening the chuck upon the rod. The spring stop allows for any variation in the degree of tightening required by the different clutches. If it is desired to vary the length of the screws to be cut, it is simply necessary to change the position of the stop plate 6. Any of the reduction tools now in use, such as shapers, formers, dies, taps or cutters may be used in this machine by attaching them in the usual manner to the tool carrying rods. In the machine as illustrated but three different tools are shown in use but it is evident that any number may be so used and I have indicated in dotted lines in Fig. 4, the position of a fourth and a fifth tool. The carrier is shown as adapted for eight rods but it is obvious that the carrier may be constructed to hold a greater number or it may be constructed to hold no more than the number of tools used. Though other forms of cutters may be used, I have found it advisable to use the form of cutter shown in Figs. 9 and 10. In this case the cutter rod M, is centrally bored to allow for the discharge of the completed screw and the chips. The cutter is spring seated in an enlargement at the upper end of said bore and a retaining screw 11, is inserted in the shank of the cutter and plays in a slot in the side of the cutter rod. The cutter head and shank have also a central bore, and it registers with the bore in the cutter rod. The cutter blade 12, is a flat piece of steel pivotally fixed in a transverse groove near the upper end of the cutter head. It has a shank projecting at one side of the pivot while the cutting edge projects substantially in the opposite direction. Against the shank of the blade the beveled end of a pin 13, engages to force the edge of the blade into the bar to be cut. This pin 13, is mounted in a vertical bore in the cutter head and rests upon the upper end of the cutter rod M. As the cutter bar is elevated and rotated a flange on the lower part of the cutter head engages a stop 14, which prevents the cutter head from rising any farther and as the cutter bar continues to rise the pin 13, is forced upward and its beveled end bearing against the shank of the cutter blade gradually forces the cutter through to the center of the bar to be cut, the head and blade rotating rapidly meanwhile. A spring as indicated at 15, may be employed to retract the cutter blade as the cutter rod descends. The cutter stop 14, consists of an arm provided with an anti-friction roller 16, said arm being adjustably mounted upon a post 17, fixed in the frame of the machine. The spline on the die rod may be made rigid therewith, but I prefer to construct it as shown in Fig. 8, wherein said rod is shown as bored sufficiently to receive a supplemental rod 18, which is slightly reduced at its upper end where it passes through a retaining cap screwed upon the die rod. A set screw 19, passes through this cap to hold the rod 18, in position. In the rod 18, is formed a slot in which is pivoted the retractible spline 20. This spline is normally forced out in position through a slot in the die rod by means of a spring 21. The spline is pivoted as shown and has its corners rounded for the purpose of enabling it to retreat into the die rod when, in the ascent or descent of said rod, it might on reaching the pinions G or I, or the collar J', be out of line with the slots therein.

A common form of die is shown in Fig. 8, as attached to its rod. In the operation of the die, as the rod is forced up, the die head 22, rests upon the socket 23, and as it engages with the work it is prevented from turning by means of short pins $a$, projecting respectively from said head and socket. As the cutting is finished and the rod begins to descend the die holds its position on the work, the engaging pins disengage, the die stops rotating and so remains until the rod in its descent has caused the spline 20, to pass into the reversing gear and has brought a shoulder on the lower end of the socket 23, into engagement with a pin 24, on the lower end of the shank 25, of the die. The die is then reversed and withdrawn from the work and as it leaves the work it drops down onto the socket. The play between the head and the socket is slightly greater than the distance the spline travels in the reversing gears so as to enable said spline to be raised out of the reversing gear into the cutting gear before the die reaches the work.

The operation of the machine is automatic throughout. All the tools are in constant rotation; the blank or rod carrier is intermittently rotated step-by-step and locked after each partial rotation, and during the stationary intervals the rotating tools are reciprocated to and from the work. At the start the machine is run slowly till the rod carrier is loaded. Then it may run at a speed that will complete a screw every three seconds. The rods 26, are inserted as each respective chuck arrives at the stop plate 6. As the first rod reaches the shaper it is operated upon thereby. At the next move of the carrier the first rod is acted upon by the die and the second is shaped. Then at the next move of the carrier, all three tools, the shaper, the die and the cutter have work to perform and the last rod is inserted. The machine may then be speeded up to its full capacity, the rods feeding down automatically as above described. All the tools will then perform their work simultaneously till the rods are all cut up. Instead of running the machine slowly while loading the rod carrier, said carrier may be loaded while at rest by clamping the rods so that they shall not project below the chucks. Then as the machine operates the rods will be successively fed down into position as the chucks are operated upon by the stops 7 and 10.

It is obvious that this invention may be carried out in many different ways and that the form of machine set forth may be variously modified and changed in many details without departing from the spirit of my invention.

What I claim as my invention is—

1. In a screw cutting or like machine, the combination of a movable blank carrier, a screw chuck secured thereto and provided with projecting lugs, a stop against which one lug strikes to open the chuck, and another stop against which another lug strikes to close the chuck.

2. In a screw cutting or like machine, the combination of a movable blank carrier, chucks secured thereto and provided with lugs, a rigid stop for loosening the chucks, and a spring mounted stop for tightening them.

3. In a screw cutting or like machine, the combination of a gravity feeding blank carrier, for a series of non-rotating blanks, said carrier being automatically rotated step-by-step, and a series of rotatable tools operating simultaneously in reducing blanks to finished articles.

4. In a blank carrier for screw cutting or like machines, the combination of a central vertical shaft, peripherally notched disk thereon, automatic catches for holding the blanks in said notches and a plate secured to said shaft and provided with chucks for holding said blanks while being operated upon.

5. A vertical blank carrier for screw cutting or like machines, consisting of a central shaft, a plate provided with a series of chucks, and peripherally notched disks secured to said shaft, and spring catches for closing the ends of said notches.

6. In a screw cutting or like machine, the combination with an intermittently rotatable gravity feeding blank carrier for a series of non-rotatable blanks, of a series of simultaneously reciprocating rotary reduction tools vertically disposed in fixed positions.

7. In a screw cutting or like machine, the combination with the tool operating gears grooved to receive a spline, of a tool operating rod provided with an automatically retractible spline spring seated within a slot in said rod.

8. In a screw cutting or like machine, the combination with the grooved die or tap, reversing and driving gears, of a grooved collar interposed between said gears, and a tool operating rod reciprocated through said gears and collar and provided with a retractible spline.

9. In a screw cutting or like machine, the combination of the grooved die driving and reversing gears, a tool rod reciprocating therein, a supplemental tool rod adjustable in said tool rod, and a retractible spline spring-seated in the supplemental rod and projecting through a slot in the tool rod.

10. In a screw cutting or like machine, the combination with a cutter-head spring-seated in a rotary reciprocating rod and provided with a pivoted transversely movable blade, of a pin resting upon said rod and with its opposite beveled end engaging the shank of said blade, and a stop for engaging said head to force the blade into action.

11. In a screw cutting or like machine, the combination with a cutter-head centrally bored and provided with a transversely operating blade, of a bored rod in which said head is spring seated, a bevel-ended pin located in a bore in said head and resting upon the end of said rod while its beveled end engages the shank of said blade, and a stop for limiting the movement of said head while the rod drives the pin forward to press the blade into the work.

12. In a screw cutting or like machine, the combination with the tool rotating gears and the tool carrying rods arranged for reciprocation in said gears respectively, of the reciprocating sleeve S provided with arms which engage said rods.

13. In a screw cutting or like machine, the combination with a vertically disposed blank carrier, of tool-carrying rods supported in the frame of the machine in a manner to reciprocate to and from said carrier, mechanism for reciprocating all of said tool carrying rods simultaneously, and gearing for rotating said rods while being reciprocated.

14. In a screw cutting or like machine, the combination with a vertically disposed blank carrier mounted upon a central shaft, intermittently operating gearing for rotating said shaft, tool carrying rods located in a circle about said shaft, gearing for rotating said rods constructed to allow the rods to reciprocate therein, a sleeve upon said shaft provided with arms for engaging said rods and means for reciprocating said sleeve and thereby causing a simultaneous reciprocation of the tool carrying rods.

Signed at New York, in the county of New York and State of New York, this 23d day of June, A. D. 1893.

JOSEF STEINER.

Witnesses:
  WM. H. CAPEL,
  THOS. F. CONREY.